US012677983B2

(12) United States Patent　(10) Patent No.:　US 12,677,983 B2
Liu et al.　(45) Date of Patent:　Jul. 14, 2026

(54) BEAN GRINDING COMPONENT WITH SELF-CLEANING FOR COFFEE MACHINE AND USE METHOD THEREOF

(71) Applicant: Zhi Shan Zhi Mei (Binhai) Trading Co., Ltd., Yancheng (CN)

(72) Inventors: Shukuo Liu, Yancheng (CN); Xu Liu, Yancheng (CN); Qing Liu, Yancheng (CN)

(73) Assignee: Zhi Shan Zhi Mei (Binhai) Trading Co., Ltd., Yancheng (CN)

( * ) Notice: Subject to any disclaimer, the term of this patent is extended or adjusted under 35 U.S.C. 154(b) by 431 days.

(21) Appl. No.: 18/320,723

(22) Filed: May 19, 2023

(65) Prior Publication Data

US 2023/0284822 A1　Sep. 14, 2023

(30) Foreign Application Priority Data

Feb. 8, 2023　(CN) .......................... 202310079927.8

(51) Int. Cl.
| | |
|---|---|
| *A47J 31/60* | (2006.01) |
| *A23F 5/26* | (2006.01) |
| *A47J 31/42* | (2006.01) |
| *A47J 31/44* | (2006.01) |
| *A47J 42/06* | (2006.01) |
| *A47J 42/10* | (2006.01) |
| *A47J 42/40* | (2006.01) |
| *A47J 42/46* | (2006.01) |
| *A47J 42/50* | (2006.01) |

(52) U.S. Cl.
CPC ................. *A47J 31/60* (2013.01); *A23F 5/26* (2013.01); *A47J 31/42* (2013.01); *A47J 31/4407* (2013.01); *A47J 42/06* (2013.01); *A47J 42/10* (2013.01); *A47J 42/40* (2013.01); *A47J 42/46* (2013.01); *A47J 42/50* (2013.01)

(58) Field of Classification Search
None
See application file for complete search history.

(56) References Cited

U.S. PATENT DOCUMENTS

| | | | | |
|---|---|---|---|---|
| 4,196,658 A | * | 4/1980 | Takagi ..................... | A47J 31/42 |
| | | | | D7/373 |
| 4,406,217 A | * | 9/1983 | Oota ........................ | A47J 31/42 |
| | | | | 392/467 |
| 4,962,693 A | * | 10/1990 | Miwa ....................... | A47J 31/42 |
| | | | | 99/302 C |
| 4,983,412 A | * | 1/1991 | Hauslein ............. | A47J 31/0631 |
| | | | | 426/433 |

(Continued)

*Primary Examiner* — Thor S Campbell
(74) *Attorney, Agent, or Firm* — Hemisphere Law, PLLC

(57) ABSTRACT

The present invention discloses a bean grinding component with self-cleaning for a coffee machine and a use method thereof. The bean grinding component comprises a main component which comprises a shell, a base and a water tank; the base is fixed to the bottom of the shell, and the water tank is arranged at one side of the shell; and a grinding component which is arranged in the shell and comprises an inner housing, a storage tank, a grinding piece, a driving piece, a water outlet sprinkler, a funnel and a filter screen; the inner housing is fixed in the shell, the storage tank is arranged in the inner housing, and the grinding piece is arranged in the storage tank.

9 Claims, 6 Drawing Sheets

(56) References Cited

U.S. PATENT DOCUMENTS

| | | | | |
|---|---|---|---|---|
| 5,865,095 | A * | 2/1999 | Mulle | A47J 31/42 |
| | | | | 99/293 |
| 5,992,299 | A * | 11/1999 | Fong | A47J 31/42 |
| | | | | 99/290 |
| 11,457,765 | B1 * | 10/2022 | Burrows | A23F 5/26 |
| 2010/0233348 | A1 | 9/2010 | Watanabe et al. | |
| 2012/0017765 | A1 * | 1/2012 | Leung | A47J 31/42 |
| | | | | 99/286 |
| 2013/0095219 | A1 | 4/2013 | de Graaff et al. | |
| 2013/0115351 | A1 | 5/2013 | Van Os et al. | |
| 2015/0238040 | A1 * | 8/2015 | Marchi | A47J 31/42 |
| | | | | 241/257.1 |
| 2017/0079465 | A1 * | 3/2017 | Nichols | A47J 31/42 |
| 2017/0119195 | A1 * | 5/2017 | Al-Shaibani | A47J 31/525 |
| 2018/0317695 | A1 * | 11/2018 | Eller | B65D 81/18 |
| 2020/0107672 | A1 * | 4/2020 | Cha | A23N 12/083 |
| 2021/0219769 | A1 * | 7/2021 | Eller | A47J 31/407 |
| 2021/0315410 | A1 * | 10/2021 | Cheng | A47J 31/525 |
| 2023/0008685 | A1 * | 1/2023 | Junge | A47J 31/3676 |
| 2023/0210303 | A1 * | 7/2023 | Masdon | A47J 31/08 |
| | | | | 426/232 |
| 2023/0284815 | A1 * | 9/2023 | Xu | A47J 31/44 |
| 2023/0284818 | A1 * | 9/2023 | Xu | A47J 31/42 |
| 2023/0284820 | A1 * | 9/2023 | Xu | A47J 31/407 |
| 2023/0284821 | A1 * | 9/2023 | Xu | A47J 31/3633 |
| 2023/0284822 | A1 * | 9/2023 | Liu | A23F 5/26 |
| 2023/0285997 | A1 * | 9/2023 | Xu | A47J 31/525 |
| 2024/0108161 | A1 * | 4/2024 | Fowler | A47J 31/461 |
| 2024/0197106 | A1 * | 6/2024 | Carlins | A47J 31/4403 |
| 2024/0407603 | A1 * | 12/2024 | Guo | A47J 42/16 |
| 2025/0017412 | A1 * | 1/2025 | Choi | A47J 31/4403 |
| 2025/0024982 | A1 * | 1/2025 | Nam | A47J 31/4403 |
| 2025/0031893 | A1 * | 1/2025 | Nam | A47J 42/10 |
| 2025/0031895 | A1 * | 1/2025 | Choi | A47J 31/525 |
| 2025/0031896 | A1 * | 1/2025 | Yang | A47J 31/461 |
| 2025/0040748 | A1 * | 2/2025 | Yang | A47J 31/10 |

* cited by examiner

207

205d

205c

202

205b

205a

BEAN GRINDING COMPONENT WITH SELF-CLEANING FOR COFFEE MACHINE AND USE METHOD THEREOF

TECHNICAL FIELD

The present invention relates to the technical field of coffee machines, in particular to a bean grinding component with self-cleaning for a coffee machine and a use method thereof.

BACKGROUND

The coffee machine is an appliance for brewing coffee. People apply the electronic technology to the coffee machine, to realize the automatic control of the whole process of brewing coffee, such as powder grinding, powder pressing, powder loading, brewing and residue removal. Most of the coffee machines in the prior art comprise two types: blade type bean grinding coffee machines and grinding coffee machines.

1. The blade type bean grinding coffee machines are noisy in use, uneven in grinding powder and inconvenient in cleaning.
2. The grinding coffee machine needs to add a sealing motor for isolating and sealing vapor and a grinding knife set; when coffee is brewed, the sealing motor needs to drive a baffle to rotate, so as to isolate the vapor generated during coffee brewing from the grinding knife set through the baffle, to prevent the vapor from entering the grinding knife set and damaging internal elements; the device is relatively high in cost, and easy to be blocked; if the seal is incomplete, the vapor is easy to enter the machine and damage the machine; and if the grinding knife set is cleaned, the grinding knife set needs to be regularly disassembled before cleaning, which is inconvenient for cleaning.

SUMMARY

The purpose of this part is to overview some aspects of embodiments of the present invention and to briefly introduce some preferred embodiments. Simplifications or omissions may be made in this part and in the abstract of description and the title of invention of the present application to avoid blurring the purposes of this part, the abstract of description and the title of invention, and such simplifications or omissions may not be used for limiting the scope of the present invention.

The present invention is proposed in view of the problems in the above and/or existing bean grinding component with self-cleaning for coffee machine and use method thereof.

Therefore, the problems to be solved by the present invention are that most coffee machines in the prior art are noisy, uneven in grinding powder and need to add a sealing motor which is relatively high in cost and easy to be blocked, the vapor is easy to enter the machine and damage the machine if the seal is incomplete, the grinding knife set is inconvenient for cleaning.

To solve the above technical problems, the present invention provides the following technical solution: a bean grinding component with self-cleaning for a coffee machine and a use method thereof. The bean grinding component comprises a main component which comprises a shell, a base and a water tank; the base is fixed to the bottom of the shell, and the water tank is arranged at one side of the shell;

a grinding component which is arranged in the shell and comprises an inner housing, a storage tank, a grinding piece, a driving piece, a water outlet sprinkler, a funnel and a filter screen, wherein the inner housing is fixed in the shell; the storage tank is arranged in the inner housing; the grinding piece is arranged in the storage tank; the driving piece is arranged in the shell; the water outlet sprinkler is located above the storage tank; the funnel is arranged at the bottom of the storage tank; the filter screen is located in the funnel; and the water outlet sprinkler, the storage tank and the funnel are communicated.

As a preferred solution of the bean grinding component with self-cleaning for the coffee machine and the use method thereof, the grinding piece comprises a conical grinding disk and a conical grinding center; the conical grinding disk is fixed at the bottom of the storage tank; and the conical grinding center is located in the conical grinding disk.

As a preferred solution of the bean grinding component with self-cleaning for the coffee machine and the use method thereof, the grinding piece further comprises a connecting shaft, a fixing plate and a positioning shaft; the connecting shaft is movably connected into the conical grinding center; the fixing plate is fixed at the bottom end of the connecting shaft; the positioning shaft is fixed at the top of the fixing plate; the conical grinding center is provided with a positioning hole; and the positioning shaft is clamped with the positioning hole.

As a preferred solution of the bean grinding component with self-cleaning for the coffee machine and the use method thereof, the grinding piece further comprises a connecting rod, a threaded rod and a nut; the connecting rod is fixed at the top end of the connecting shaft; one end of the threaded rod is fixed with the connecting rod; and the nut is in threaded connection to the outer side of the threaded rod.

As a preferred solution of the bean grinding component with self-cleaning for the coffee machine and the use method thereof, the grinding piece further comprises a fixing sleeve and a supporting rod; the fixing sleeve is located at the outer side of the connecting shaft; and both ends of the supporting rod are fixed with the fixing sleeve and the inner wall of the storage tank respectively.

As a preferred solution of the bean grinding component with self-cleaning for the coffee machine and the use method thereof, the grinding piece further comprises a supporting plate and a second spring; the supporting plate is fixed at the outer side of the connecting shaft; and both ends of the second spring are fixed with the supporting plate and the conical grinding center respectively and sleeved on the outer side of the connecting shaft.

As a preferred solution of the bean grinding component with self-cleaning for the coffee machine and the use method thereof, the driving piece comprises a motor, a driving gear, a driven gear and a water baffle; the motor is arranged in the shell; the driving gear is fixed with an output shaft of the motor; the driven gear is rotatably connected to the top of the storage tank through a bearing; the water baffle is fixed at the top of the driven gear, and is located at the outer side of the water outlet sprinkler; the driving gear and the driven gear are engaged; and the driven gear is in a hollow state.

A use method of the bean grinding component with self-cleaning for the coffee machine comprises the following steps: the main component further comprises an upper cover, a locking piece and a tray; the upper cover is hinged on the top of the shell through a hinge; the locking piece is arranged in the upper cover; and the tray is arranged on the base.

As a preferred solution of the bean grinding component with self-cleaning for the coffee machine and the use method thereof, the locking piece comprises a push rod, a locking block, a first spring and a stopper; one side of the upper cover is provided with a chamber; the push rod is located in the chamber; the locking block is fixed at the bottom of the push rod; the push rod is provided with a groove; both sides of the first spring are fixed with the inner wall of the groove and the inner wall of the chamber respectively; the stopper is fixed on the top of the push rod; and one side of the stopper is in contact with the inner wall of the chamber.

As a preferred solution of the bean grinding component with self-cleaning for the coffee machine and the use method thereof, the use method comprises: firstly, pouring coffee beans into the storage tank, starting the grinding piece and grinding the coffee beans through the grinding piece;

making the ground coffee powder fall into the filter screen, and collecting the coffee powder through the filter screen;

after the coffee beans are completely ground into the powder, water adding time is 30 seconds to 15 minutes and the temperature of hot water is 68-99° C.;

starting the grinding piece again to make the grinding piece idle when the water outlet sprinkler adds water to the storage tank;

washing the grinding piece and the inner wall of the storage tank when the hot water enters the storage tank, and making the hot water after cleaning and impurities cleaned from the grinding piece fall into the funnel and mix with the coffee powder to complete the brewing of coffee.

The present invention has the beneficial effects: through the arrangement of the grinding component, after coffee beans are ground and need to be brewed, the grinding piece can be cleaned during brewing, so as to solve the inconvenience of cleaning.

DESCRIPTION OF DRAWINGS

To more clearly describe the technical solutions in the embodiments of the present invention, the drawings required to be used in the embodiments will be simply presented below. Apparently, the drawings in the following description are merely some embodiments of the present invention, and for those skilled in the art, other drawings can also be obtained according to these drawings without contributing creative labor. Wherein.

DETAILED DESCRIPTION

To make the above-mentioned purpose, features and advantages of the present invention more clear and understandable, specific embodiments of the present invention will be described below in detail in combination with the drawings of the description.

Many details are elaborated in the following description for convenience of fully understanding the present invention. However, the present invention can also be implemented in other modes different from those described herein. Those skilled in the art may make similar promotion without departing from the connotation of the present invention. Therefore, the present invention is not limited by specific embodiments disclosed below.

Secondly, the term "an embodiment" or "embodiment" herein means a specific feature, structure or characteristic that may be included in at least one implementation of the present invention. "In an embodiment" appearing in different places in the description does not mean the same embodiment, nor a separate or selective embodiment that is mutually exclusive with other embodiments.

Embodiment 1

Figure 1:
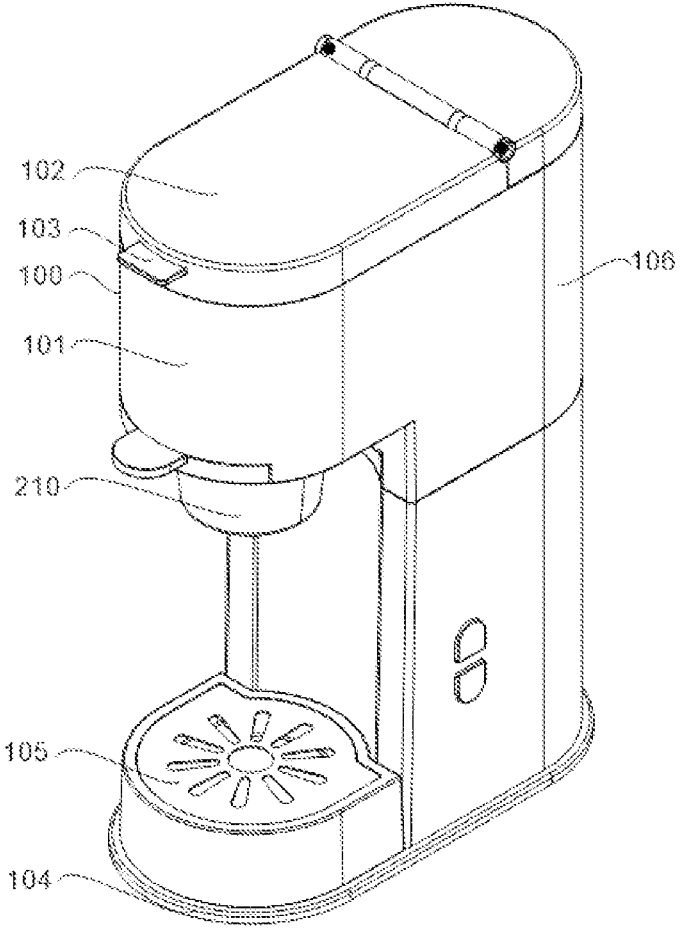
FIG. 1 is an overall structural diagram of a bean grinding component with self-cleaning for a coffee machine and a use method thereof.
Figure 2:
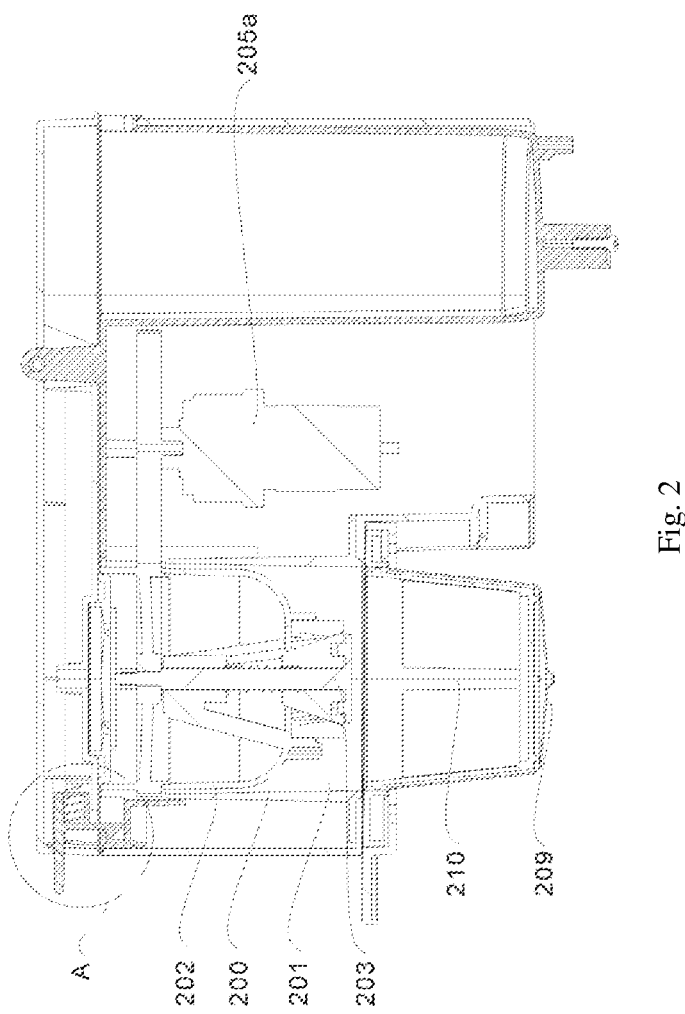
FIG. 2 is a local sectional structural diagram of a shell of a bean grinding component with self-cleaning for a coffee machine and a use method thereof.
Figure 3:
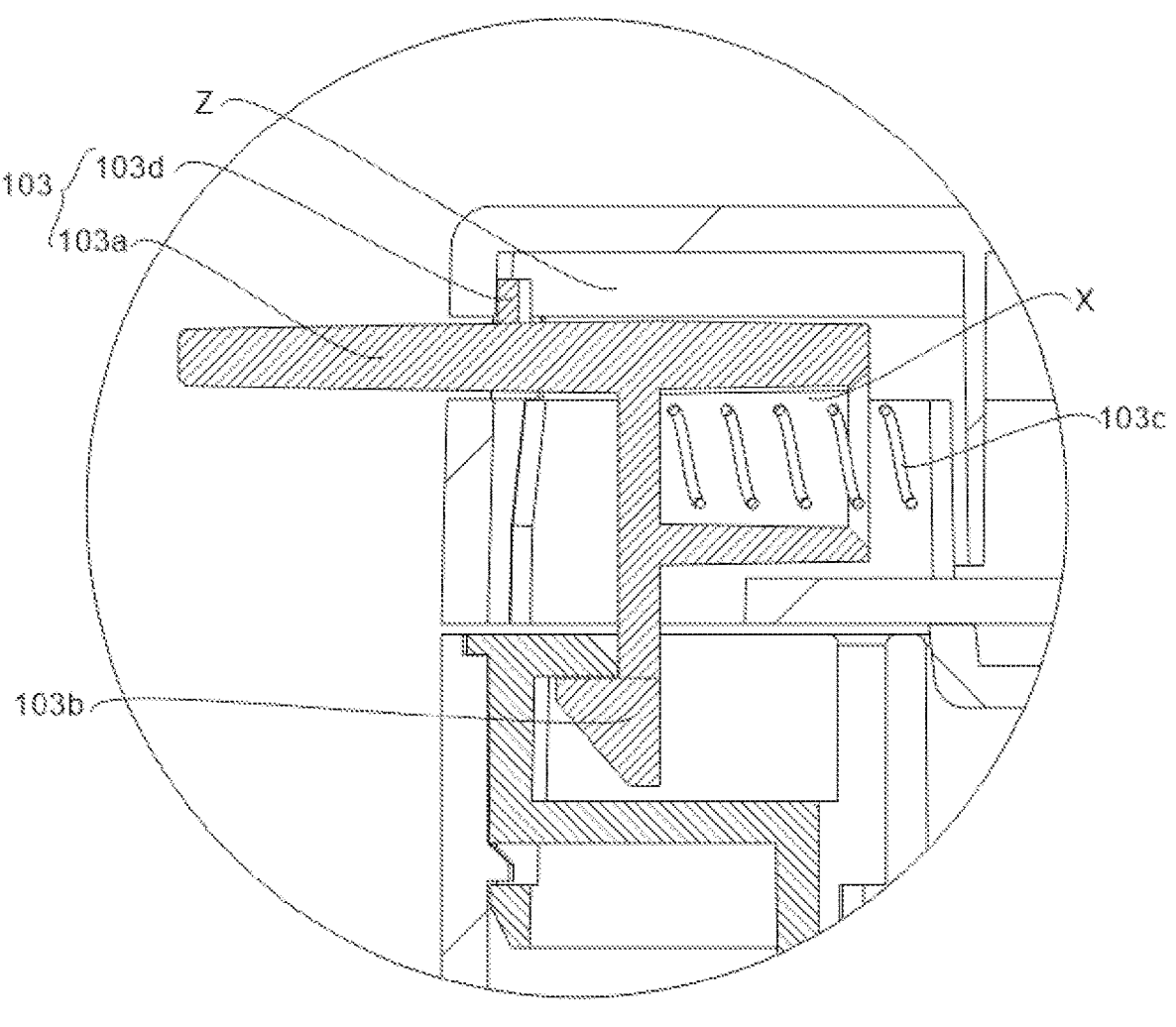
FIG. 3 is a local enlarged view of A in FIG. 2 of a bean grinding component with self-cleaning for a coffee machine and a use method thereof.
Figure 4:
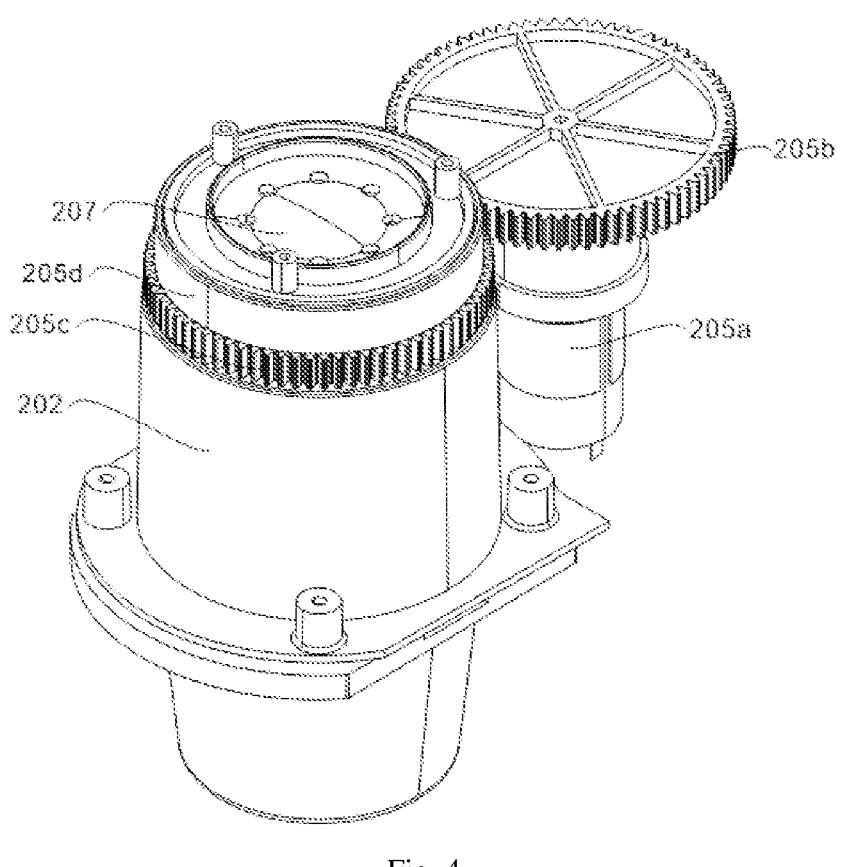
FIG. 4 is a connection structural diagram of a driven gear and a driving gear of a bean grinding component with self-cleaning for a coffee machine and a use method thereof.
Figure 5:
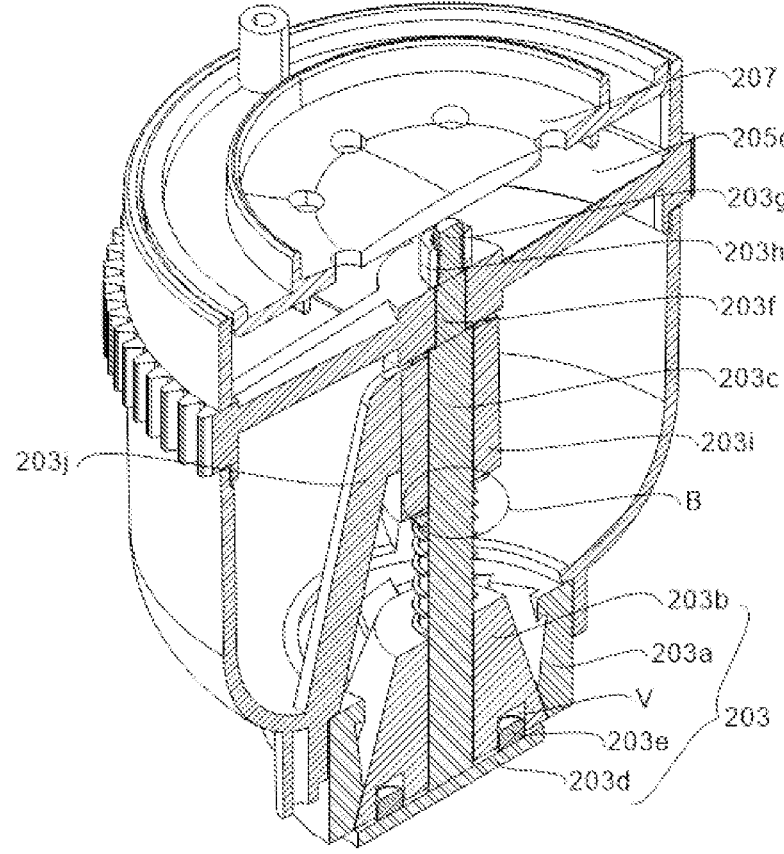
FIG. 5 is a sectional structural diagram of an inner housing of a bean grinding component with self-cleaning for a coffee machine and a use method thereof.
Figure 6:
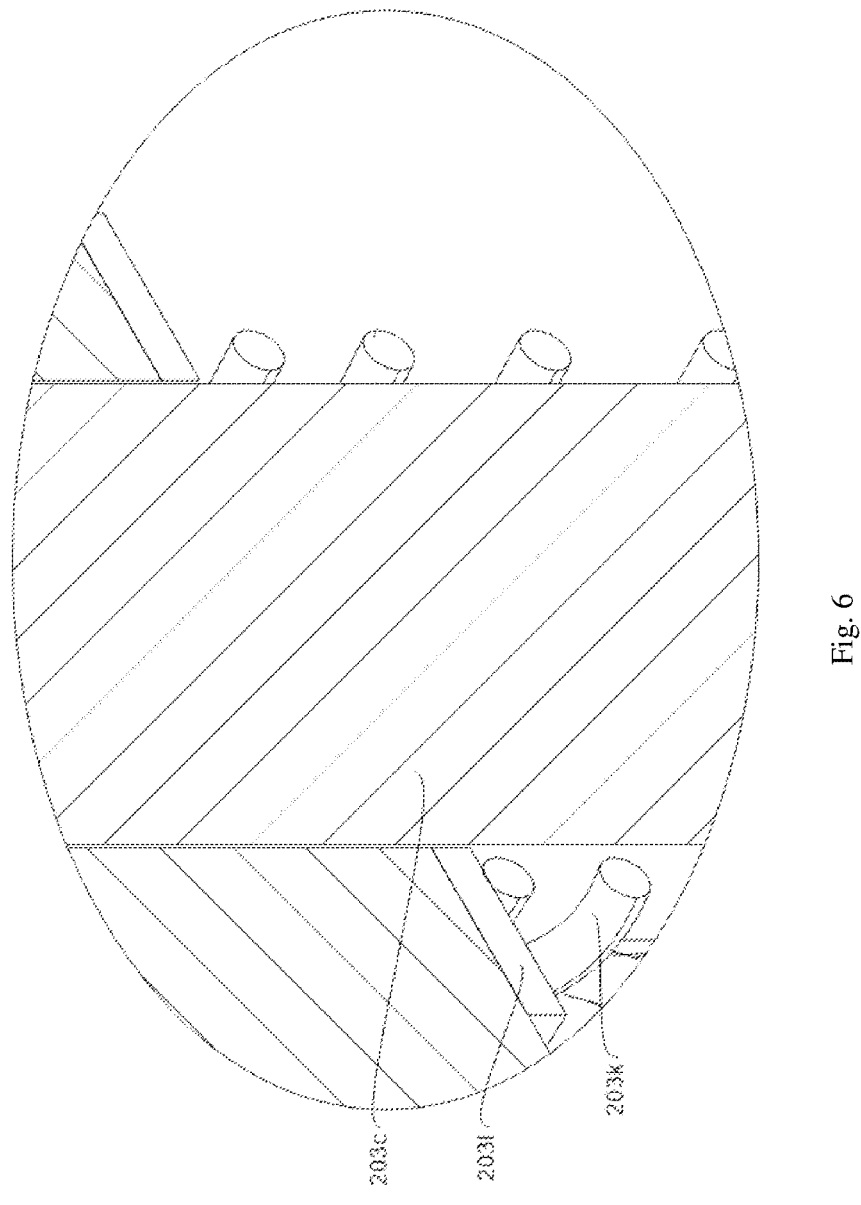
FIG. 6 is a local enlarged view of B in FIG. 5 of a bean grinding component with self-cleaning for a coffee machine and a use method thereof.

By referring to FIG. 1 to FIG. 6 which show the first embodiment of the present invention, the embodiment provides a bean grinding component with self-cleaning for a coffee machine and a use method thereof. The bean grinding component with self-cleaning for the coffee machine and the use method thereof comprise a main component 100 and a grinding component 200. The grinding component 200 can complete self-cleaning while brewing, which solves the problem of inconvenient cleaning of a grinding knife set.

The main component 100 comprises a shell 101, a base 104 and a water tank 106; the base 104 is fixed to the bottom of the shell 101, and the water tank 106 is arranged at one side of the shell 101.

The base 104 can prevent the shell 101 from being offset when placed. The water tank 106 is used for storing water. A heating mechanism (not shown in the figure) is arranged inside the shell 101, and the water is heated through the heating mechanism.

The grinding component 200 is arranged in the shell 101 and comprises an inner housing 201, a storage tank 202, a grinding piece 203, a driving piece 205, a water outlet sprinkler 207, a funnel 209 and a filter screen 210. The inner housing 201 is fixed in the shell 101; the storage tank 202 is arranged in the inner housing 201; the grinding piece 203 is arranged in the storage tank 202; the driving piece 205 is arranged in the shell 101; the water outlet sprinkler 207 is located above the storage tank 202; the funnel 209 is arranged at the bottom of the storage tank 202; the filter screen 210 is located in the funnel 209; and the water outlet sprinkler 207, the storage tank 202 and the funnel 209 are communicated.

The inner housing 201 is used for fixing the storage tank 202. The storage tank 202 is used for storing coffee beans. The grinding piece 203 is arranged for grinding the coffee beans. The driving piece 205 is arranged for driving the grinding piece 203 to rotate so that the grinding piece 203 grinds the coffee beans; the ground coffee powder falls into the funnel 209; the funnel 209 is used for collecting the coffee, and the ground powder is filtered through the filter screen 210; the water outlet sprinkler 207 is communicated with the water tank 106; and when the coffee powder is brewed, hot water is conveyed into the storage tank 202 through the water outlet sprinkler 207, and flows into the grinding piece 203; at the same time, the grinding piece 203 can be cleaned. When the hot water is conveyed, the grinding piece 203 is in an idling state, so that the hot water can thoroughly clean the inside of the grinding piece 203. The hot water after cleaning falls into the funnel 209 and is mixed with the coffee powder, so as to complete the brewing of the coffee powder. The water baffle 205*d* is arranged to prevent the hot water from sputtering when the hot water is conveyed. The storage tank 202 is movably connected with the inner housing 201. Thus, the storage tank 202 can be taken out from the inner housing 201, and the internal grinding piece 203 can be further cleaned or maintained. The water outlet sprinkler 207 is fixed with the top of the upper cover 102. When the upper cover 102 is opened, the water outlet sprinkler 207 is driven to move upward, so as to take out the storage tank 202.

Embodiment 2

By referring to FIG. 1 to FIG. 6 which show the second embodiment of the present invention, the embodiment is based on the above embodiment.

Specifically, the grinding piece 203 comprises a conical grinding disk 203*a* and a conical grinding center 203*b*; the conical grinding disk 203*a* is fixed at the bottom of the storage tank 202; and the conical grinding center 203*b* is located in the conical grinding disk 203*a*.

The conical grinding center 203*b* is movably connected with the conical grinding disk 203*a*. When the conical grinding center 203*b* is rotating, the coffee beans can be ground by matching the conical grinding disk 203*a*, and there is a certain gap between the conical grinding center 203*b* and the conical grinding disk 203*a*. The ground coffee powder can fall down through the gap.

Specifically, the grinding piece 203 further comprises a connecting shaft 203*c*, a fixing plate 203*d* and a positioning shaft 203*e*; the connecting shaft 203*c* is movably connected into the conical grinding center 203*b*; the fixing plate 203*d* is fixed at the bottom end of the connecting shaft 203*c*; the positioning shaft 203*e* is fixed at the top of the fixing plate 203*d*; the conical grinding center 203*b* is provided with a positioning hole V; and the positioning shaft 203*e* is clamped with the positioning hole V.

The number of the positioning shafts 203*e* is two, and the positioning shafts are fixed on both sides of the top of the fixing plate 203*d* respectively. When the positioning shafts 203*e* are clamped with the positioning hole V, the fixing plate 203*d* can be connected with the conical grinding center 203*b*, so that the fixing plate 203*d* can drive the conical grinding center 203*b* to rotate when rotating. The connecting shaft 203*c* is used for driving the fixing plate 203*d* to rotate.

Specifically, the grinding piece 203 further comprises a connecting rod 203*f*, a threaded rod 203*g* and a nut 203*h*; the connecting rod 203*f* is fixed at the top end of the connecting shaft 203*c*; one end of the threaded rod 203*g* is fixed with the connecting rod 203*f*; and the nut 203*h* is in threaded connection to the outer side of the threaded rod 203*g*.

The connecting rod 203*f* is rectangular, and a through hole is formed in the center of the driven gear 205*c*. The through hole is rectangular, and the connecting rod 203*f* is movably connected with the through hole. When the driven gear 205*c* rotates, the connecting shaft 203*c* can be driven to rotate through the coordination of the connecting rod 203*f* and the through hole. The position of the connecting shaft 203*c* can be adjusted through the coordination of the threaded rod 203*g* and the nut 203*h*, so that the connecting shaft can drive the conical grinding center 203*b* to move, so that the conical grinding center 203*b* grinds the coffee beans in an appropriate position.

Specifically, the grinding piece 203 further comprises a fixing sleeve 203*i* and a supporting rod 203*j*; the fixing sleeve 203*i* is located at the outer side of the connecting shaft 203*c*; and both ends of the supporting rod 203*j* are fixed with the fixing sleeve 203*i* and the inner wall of the storage tank 202 respectively.

The number of the supporting rods 203*j* is three, and the supporting rods are uniformly distributed at the outer side the fixing sleeve 203*i*. The supporting rods 203*j* are used for supporting and fixing the fixing sleeve 203*i*, and the connecting shaft 203*c* is movably connected with the fixing sleeve 203*i*. The fixing sleeve 203*i* is arranged for positioning the connecting shaft 203*c* to prevent the connecting shaft from being offset when rotating.

Specifically, the grinding piece 203 further comprises a supporting plate 2031 and a second spring 203*k*; the supporting plate 2031 is fixed at the outer side of the connecting shaft 203*c*; and both ends of the second spring 203*k* are fixed with the supporting plate 2031 and the conical grinding center 203*b* respectively and sleeved on the outer side of the connecting shaft 203*c*.

The supporting plate 2031 is used for fixing the second spring 203*k*. The second spring 203*k* is arranged for exerting a downward thrust on the conical grinding center 203*b*, so that the conical grinding center 203*b* can be always internally fitted with the conical grinding disk 203*a* to avoid the separation of the conical grinding center and the conical grinding disk.

Specifically, the driving piece 205 comprises a motor 205*a*, a driving gear 205*b*, a driven gear 205*c* and a water baffle 205*d*; the motor 205*a* is arranged in the shell 101; the driving gear 205*b* is fixed with an output shaft of the motor 205*a*; the driven gear 205*c* is rotatably connected to the top of the storage tank 202 through a bearing; the water baffle 205*d* is fixed at the top of the driven gear 205*c*, and is located at the outer side of the water outlet sprinkler 207; the driving gear 205*b* and the driven gear 205*c* are engaged; and the driven gear 205*c* is in a hollow state.

The motor 205*a* is internally fixed with the shell 101 through a bracket. The motor 205*a* is used for driving the driving gear 205*b* to rotate, and the driving gear 205*b* drives the driven gear 205*c* to rotate, so that the driven gear 205*c* drives the connecting rod 203*f* and the connecting shaft 203*c* to rotate, so that the connecting shaft 203*c* drives the conical grinding center 203*b* to rotate. The device is driven only by one motor 205*a*. By setting the water outlet sprinkler 207, the storage tank 202 and the funnel 209 in a communicated state, firstly, the hot water conveyed by the water outlet sprinkler 207 can be directly discharged into the funnel 209, which can complete the conveying of the hot water and also clean the grinding piece 203, and secondly, there is no need to add an additional motor and baffle to block the vapor inside the funnel 209, thereby reducing the cost.

Specifically, the main component 100 further comprises an upper cover 102, a locking piece 103 and a tray 105; the upper cover 102 is hinged on the top of the shell 101 through a hinge; the locking piece 103 is arranged in the upper cover 102; and the tray 105 is arranged on the base 104.

The upper cover 102 is used for sealing the inside of the shell 101 to prevent sundries from falling into the shell 101. The locking piece 103 is used for locking and fixing the upper cover 102, so as to avoid opening the upper cover 102 by accidental touch under external force. The tray 105 is used for placing a kettle or water cup.

Specifically, the locking piece 103 comprises a push rod 103*a*, a locking block 103*b*, a first spring 103*c* and a stopper 103*d*; one side of the upper cover 102 is provided with a chamber Z; the push rod 103a is located in the chamber Z; the locking block 103b is fixed at the bottom of the push rod 103a; the push rod 103a is provided with a groove X; both sides of the first spring 103c are fixed with the inner wall of the groove X and the inner wall of the chamber Z respectively; the stopper 103d is fixed on the top of the push rod 103a; and one side of the stopper 103d is in contact with the inner wall of the chamber Z.

One side of the push rod 103a extends to the outer side of the upper cover 102 and is movably connected with the upper cover 102. One side of the locking block 103b is inclined and a bump is fixed inside the shell 101. The locking block 103b is clamped with the bump s that the upper cover 102 can be limited and cannot be opened. The push rod 103a is used for driving the locking block 103b to move. The first spring 103c is arranged for exerting a thrust on the push rod 103a, and the push rod 103a drives the locking block 103b to move, so that the locking block 103b is clamped with the bump more firmly, to avoid the separation of the two. The stopper 103d is used for blocking the push rod 103a to prevent the push rod 103a from moving to the outer side of the upper cover 102.

Embodiment 3

By referring to FIG. 1 to FIG. 6 which show the third embodiment of the present invention, the embodiment is based on the above two embodiments.

Specifically, firstly, coffee beans are poured into the storage tank 202, the grinding piece 203 is started and the coffee beans are ground through the grinding piece 203;

The ground coffee powder falls into the filter screen 210, and the coffee powder is collected through the filter screen 210;

Hot water is added to the storage tank 202 through the water outlet sprinkler 207 after the coffee beans are completely ground into the powder, water adding time is 30 seconds to 15 minutes and the temperature of the hot water is 68-99° C.;

The grinding piece 203 is started again to make the grinding piece idle when the water outlet sprinkler 207 adds water to the storage tank 202;

The grinding piece 203 and the inner wall of the storage tank 202 are washed when the hot water enters the storage tank 202, and the hot water after cleaning and impurities cleaned from the grinding piece 203 fall into the funnel 209 and are mixed with the coffee powder to complete the brewing of coffee.

The specific operation mode is as follows: firstly, the coffee beans are poured into the storage tank 202; then, the motor 205a is started to drive the driving gear 205b to rotate; the driving gear 205b drives the driven gear 205c to rotate; when the driven gear 205c rotates, the connecting shaft 203c is driven to rotate through the cooperation of the connecting rod 203f and the through hole, and the connecting shaft 203c drives the fixing plate 203d to rotate; during rotation, the fixing plate 203d drives the conical grinding center 203b to rotate through the cooperation of the positioning shaft 203e and the positioning hole V, so that the coffee beans can be ground through the cooperation of the conical grinding center 203b and the conical grinding disk 203a. The ground coffee powder falls into the filter screen 210 through the gap. When the coffee beans are completely ground and the coffee powder completely falls into the filter screen 210, the water in the water tank 106 is heated by the heating mechanism. When the temperature of the water is appropriate, the hot water is conveyed into the storage tank 202 through the water outlet sprinkler 207. Firstly, the inside of the storage tank 202 is preliminarily cleaned, and then the water falls into the conical grinding center 203b and the conical grinding disk 203a. At this time, the motor 205a is started again to make the conical grinding disk 203b in an idling state. When the conical grinding disk 203b rotates, the hot water continues to flow to the surface. Through the flow of the hot water, the residues between the conical grinding disk 203b and the conical grinding disk 203a can be washed, so as to avoid later difficult cleaning caused by excessive residues.

It should be noted that the above embodiments are only used for describing, rather than limiting the technical solution of the present invention. Although the present invention is described in detail with reference to the preferred embodiments, those ordinary skilled in the art shall understand that the technical solution of the present invention can be amended or equivalently replaced without departing from the spirit and the scope of the technical solution. The amendment or equivalent replacement shall be covered within the scope of the claims of the present invention.

The invention claimed is:

1. A bean grinding component with self-cleaning for a coffee machine, comprising:

a main component (100) which comprises a shell (101), a base (104) and a water tank (106), wherein the base (104) is fixed to the bottom of the shell (101), and the water tank (106) is arranged at one side of the shell (101);

a grinding component (200) which is arranged in the shell (101) and comprises an inner housing (201), a storage tank (202), a grinding piece (203), a driving piece (205), a water outlet sprinkler (207), a funnel (209) and a filter screen (210), wherein the inner housing (201) is fixed in the shell (101); the storage tank (202) is arranged in the inner housing (201); the grinding piece (203) is arranged in the storage tank (202); the driving piece (205) is arranged in the shell (101); the water outlet sprinkler (207) is located above the storage tank (202); the funnel (209) is arranged at the bottom of the storage tank (202); the filter screen (210) is located in the funnel (209); and the water outlet sprinkler (207), the storage tank (202) and the funnel (209) are communicated;

wherein the grinding piece (203) comprises a conical grinding disk (203a) and a conical grinding center (203b), and a connecting shaft (203c); the conical grinding disk (203a) is fixed at the bottom of the storage tank (202); the conical grinding center (203b) is located in the conical grinding disk (203a); the connecting shaft (203c) is movably connected into the conical grinding center (203b); and the grinding piece (203) further comprises a fixing sleeve (203i) and a supporting rod (203j); the fixing sleeve (203i) is located at the outer side of the connecting shaft (203c); and both ends of the supporting rod (203j) are fixed with the fixing sleeve (203i) and the inner wall of the storage tank (202) respectively.

2. The bean grinding component with self-cleaning for the coffee machine according to claim 1, wherein the grinding piece (203) further comprises a fixing plate (203d) and a positioning shaft (203e); the fixing plate (203d) is fixed at the bottom end of the connecting shaft (203c); the positioning shaft (203e) is fixed at the top of the fixing plate (203d); the conical grinding center (203b) is provided with a positioning hole (V); and the positioning shaft (203e) is clamped with the positioning hole (V).

3. The bean grinding component with self-cleaning for the coffee machine according to claim 2, wherein the grinding piece (203) further comprises a connecting rod (203*f*), a threaded rod (203*g*) and a nut (203*h*); the connecting rod (203*f*) is fixed at the top end of the connecting shaft (203*c*); one end of the threaded rod (203*g*) is fixed with the connecting rod (203*f*); and the nut (203*h*) is in threaded connection to the outer side of the threaded rod (203*g*).

4. The bean grinding component with self-cleaning for the coffee machine according to claim 1, wherein the grinding piece (203) further comprises a supporting plate (2031) and a second spring (203*k*); the supporting plate (2031) is fixed at the outer side of the connecting shaft (203*c*); and both ends of the second spring (203*k*) are fixed with the supporting plate (2031) and the conical grinding center (203*b*) respectively and sleeved on the outer side of the connecting shaft (203*c*).

5. The bean grinding component with self-cleaning for the coffee machine according to claim 4, wherein the driving piece (205) comprises a motor (205*a*), a driving gear (205*b*), a driven gear (205*c*) and a water baffle (205*d*); the motor (205*a*) is arranged in the shell (101); the driving gear (205*b*) is fixed with an output shaft of the motor (205*a*); the driven gear (205*c*) is rotatably connected to the top of the storage tank (202) through a bearing; the water baffle (205*d*) is fixed at the top of the driven gear (205*c*), and is located at the outer side of the water outlet sprinkler (207); the driving gear (205*b*) and the driven gear (205*c*) are engaged; and the driven gear (205*c*) is in a hollow state.

6. The bean grinding component with self-cleaning for the coffee machine according to claim 4, wherein the main component (100) further comprises an upper cover (102), a locking piece (103) and a tray (105); the upper cover (102)

is hinged on the top of the shell (101) through a hinge; the locking piece (103) is arranged in the upper cover (102); and the tray (105) is arranged on the base (104).

7. The bean grinding component with self-cleaning for the coffee machine according to claim 6, wherein the locking piece (103) comprises a push rod (103*a*), a locking block (103*b*), a first spring (103*c*) and a stopper (103*d*); one side of the upper cover (102) is provided with a chamber (Z); the push rod (103*a*) is located in the chamber (Z); the locking block (103*b*) is fixed at the bottom of the push rod (103*a*); the push rod (103*a*) is provided with a groove (X); both sides of the first spring (103*c*) are fixed with the inner wall of the groove (X) and the inner wall of the chamber (Z) respectively; the stopper (103*d*) is fixed on the top of the push rod (103*a*); and one side of the stopper (103*d*) is in contact with the inner wall of the chamber (Z).

8. The bean grinding component with self-cleaning for the coffee machine according to claim 3, wherein the grinding piece (203) further comprises a fixing sleeve (203*i*) and a supporting rod (203*j*); the fixing sleeve (203*i*) is located at the outer side of the connecting shaft (203*c*); and both ends of the supporting rod (203*j*) are fixed with the fixing sleeve (203*i*) and the inner wall of the storage tank (202) respectively.

9. The bean grinding component with self-cleaning for the coffee machine according to claim 5, wherein the main component (100) further comprises an upper cover (102), a locking piece (103) and a tray (105); the upper cover (102) is hinged on the top of the shell (101) through a hinge; the locking piece (103) is arranged in the upper cover (102); and the tray (105) is arranged on the base (104).

\* \* \* \* \*